Jan. 8, 1963

W. H. PAGE II 3,072,458

METHOD OF CATALYTICALLY PURIFYING EXHAUST GASES
OF INTERNAL COMBUSTION ENGINES AND CYCLICALLY
REGENERATING THE LEAD-CONTAMINATED
CATALYST

Filed May 31, 1960

INVENTOR:
William H. Page II

BY: *Chester J. Giuliani*
*James R. Hoston Jr.*

ATTORNEYS

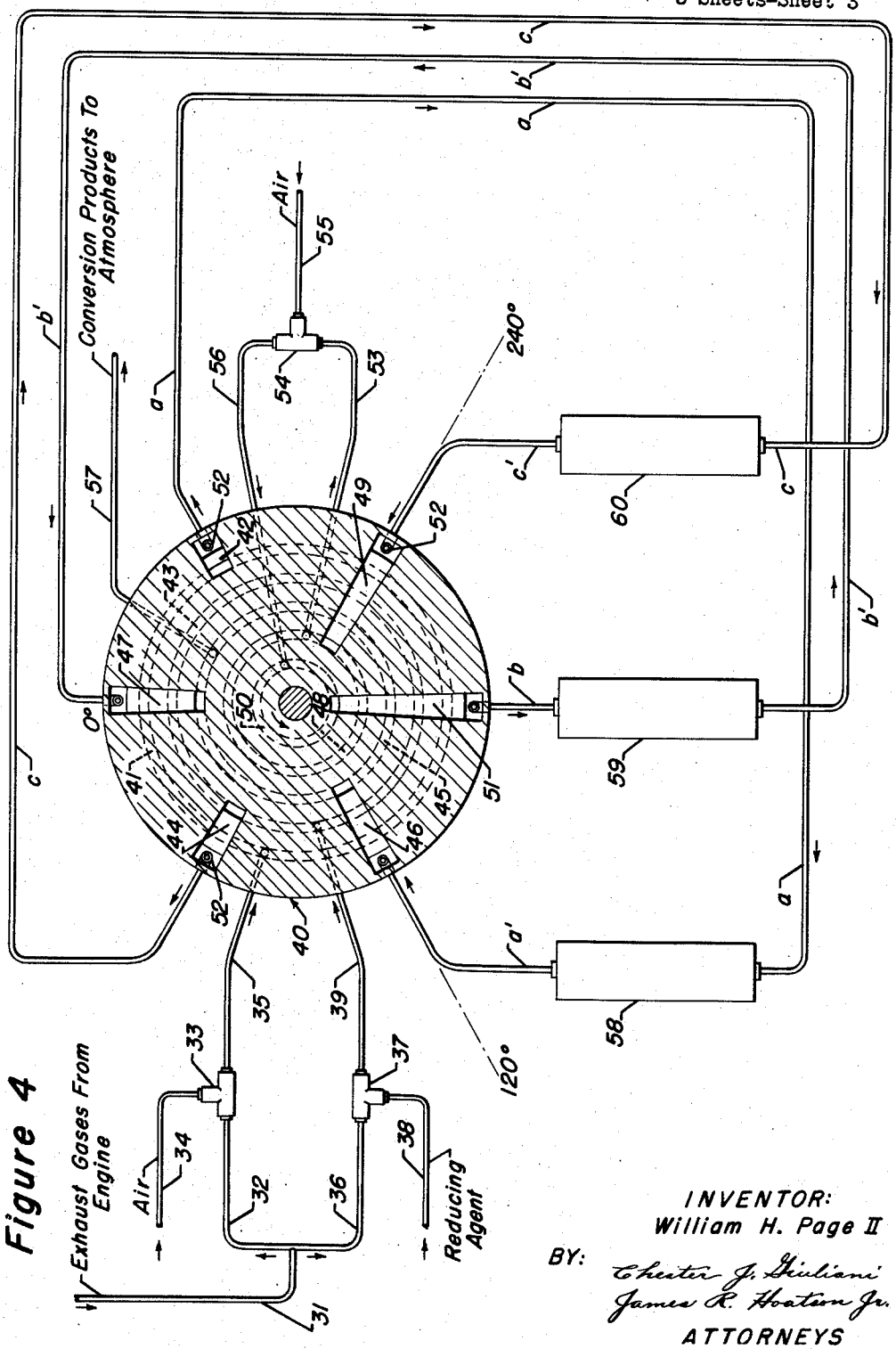

United States Patent Office 3,072,458
Patented Jan. 8, 1963

3,072,458
METHOD OF CATALYTICALLY PURIFYING EXHAUST GASES OF INTERNAL COMBUSTION ENGINES AND CYCLICALLY REGENERATING THE LEAD-CONTAMINATED CATALYST
William H. Page II, Winnetka, Ill., assignor to Universal Oil Products Company, Des Plaines, Ill., a corporation of Delaware
Filed May 31, 1960, Ser. No. 32,651
9 Claims. (Cl. 23—2)

The present invention relates to the regeneration or reactivation of catalytic contact masses which have become contaminated with lead as a consequence of exposure to contact with lead-containing waste products incident to the catalytic conversion of such waste products. In particular, the present invention concerns the regeneration of catalysts employed in the conversion of the exhaust gases emanating from an internal combustion engine using leaded fuel, and is further directed to a cyclic regenerative conversion process for effecting the continuous conversion of such exhaust gases.

It is now recognized that the elimination of certain components present in automotive exhaust gases is highly desirable and of prime importance in protecting the public health and welfare. The unavoidably incomplete combustion of hydrocarbon fuels by the gasoline or diesel engine results in the generation of substantial quantities of unburned hydrocarbons and other undesirable materials which, as waste products, are released to the atmosphere through the exhaust line. With the ever-increasing concentration of automobiles, particularly in urban areas, the discharge of such waste products into the atmosphere may reach significantly deleterious proportions. These combustion products are believed to react with atmospheric oxygen, under the influence of sunlight, to produce what is now commonly referred to as smog. Such combustion products include, by way of example, unsaturated hydrocarbons, partially oxidized hydrocarbons such as alcohols, ketones, aldehydes and acids, etc., carbon monoxide, and various oxides of nitrogen and sulfur. Although at least a portion of these compounds may be partially removed by chemical sorption media, the conversion of exhaust gas constituents by catalytic means is by far the preferred technique. The desired objective is to achieve substantially complete conversion of all of the unburned hydrocarbons, particularly the high molecular weight unsaturated hydrocarbons, and carbon monoxide, as well as the partially-oxidized hydrocarbons hereinabove set forth, into carbon dioxide and water prior to discharging the exhaust gases into the atmosphere. Gasoline-powered internal combustion engines are a major but not the only source of atmospheric pollution; others include diesel engines, butane engines, natural gas engines, fired heaters, flare stacks, and the like.

Catalytic means for improving waste products for discharge into the atmosphere, and particularly for the conversion of the hydrocarbonaceous combustion products contained within the exhaust gases emanating from an internal combustion engine, necessitate the use of a catalyst possessing an exceptionally high degree of activity, and, particularly, stability or capability of performing its intended function for an extended period of time. A wide variety of factors affect the stability of active catalytic composites, which factors are generally peculiar to the environment in which the catalyst is employed. In regard to catalysts for the conversion of hydrocarbonaceous combustion products emanating from an internal combustion engine, the actual operation of the engine must be considered. For example, such engine is commonly operated over a wide range of speed and load conditions and, therefore, the combustion efficiency thereof correspondingly varies; the space velocity and temperature of the exhaust gases, as well as the concentration of combustible material therein, likewise vary over wide limits. The catalyst should be capable of withstanding high temperatures of the order of 1600° F. to as high as 2000° F. without rapid thermal deactivation, but should possess maximum activity at substantially lower temperatures. The catalyst should have a relatively low threshold-activation temperature in order that the conversion reactions be self-initiating within a minimum time following startup from relatively cold conditions. In general, it is desirable that the catalyst be satisfactorily active at temperatures within the range of about 200° F. to about 2000° F.

The catalyst is usually disposed as a confined particle-form bed placed in a suitable container or catalytic convertor which is installed in the engine exhaust line. The catalytic converter may be of the through-flow, cross-flow, or radial-flow design and, in the case of vehicular applications, may supplant or be combined with the usual acoustic muffler. In the majority of systems, secondary or combustion air is injected upstream of the catalytic conversion zone, usually by means of an aspirator or by external compressor means.

Although a great many potentially good, high activity catalysts have been developed which perform well even under the aforesaid adverse conditions, such catalysts are nevertheless deleteriously effected by lead and lead compounds which are present as vapors or as entrained solids in the exhaust gases resulting from the combustion of a leaded fuel. The majority of motor fuels, including some diesel fuels and fuels for marine engines, contain tetraethyl lead or equivalent lead compounds as an additive for increasing the anti-knock efficiency of the engine in which the fuel is consumed. A typical commercial tetraethyl lead additive contains, in addition, approximately 2 gram-atoms of chlorine and 1 gram-atom of bromine, usually as ethylene dihalide, per mol of lead, which is thus 1.5 times the stoichiometric quantity of halogen required to form the lead dihalide; in conventional terminology, the tetraethyl lead additive is said to contain 1.5 "theories" of halogen. The halogen serves as a scavenging agent to prevent buildup of lead deposits on spark plugs and engine cylinder walls by preferentially converting the lead tetraethyl, under the elevated cylinder temperatures prevailing during combustion, to highly volatile lead halides, for example, to lead chloride and lead bromide or to the oxyhalides of lead; minor quantities of lead do not react with halogen and are converted instead to less volatile lead oxides. The major proportion of these lead compounds are discharged, as vapors or fines, into the exhaust line along with the exhaust gases. When the resulting lead-contaminated exhaust gases pass into contact with the exhaust gas conversion catalyst, the stability of the catalyst is substantially impaired, which phenomenon is demonstrated by the fact that the catalyst deactivation rate is very much greater than when unleaded fuel is employed.

On its face, this result would appear quite anomalous since most of the lead enters the conversion zone as a halide, and the normal catalyst bed temperature is in the range of 500° F. to 1600° F. whereby such halide is readily volatilized, whence one would expect the lead halide to pass completely through the bed with as much facility as it escaped deposition upon the engine cylinder walls and exhaust manifold structure. Such, however, is not the case. Although various theories have been proposed to explain the deactivation of catalysts by lead, it appears that the principal mechanism by which catalyst poisoning or deactivation occurs is one of chemical reaction between the volatile lead compounds and the catalyst base whereby to yield a stable, relatively non-volatile lead compound-catalyst base complex which plugs the pores of the catalyst and/or forms a mono-molecular film of complex over the entire microstructure of the catalyst; evidence favors the latter theory because, in most instances, physical measurements of spent lead-contaminated catalyst reveal no appreciable reduction in surface area or pore volume as against those of the fresh catalyst. By catalyst base is meant a refractory inorganic oxide carrier or support, preferably of medium to high surface area, with which one or more catalytically active metals are composited. Typical bases includes, for example, alumina, titania, silica, alumina-silica, alumina-zirconia, alumina-silica-zirconia, and the like. The deactivation of the catalyst is believed to proceed via the following reactions which are exemplary but not exhaustive of the several interactions of lead compounds with catalyst bases:

(1) $MeOH + PbX_2 \rightleftharpoons MeOPbX + HX$
(2) $MeOH + MeOPbX \rightleftharpoons MeOPbOMe + HX$
(3) $MeOPbX + H_2O \rightleftharpoons MeOPbOH + HX$
(4) $MeO + PbX_2 + H_2O \rightleftharpoons MeO_2Pb + 2HX$ where Me is a metallic component of the catalyst base, e.g. Al, Zr, Ti, etc. and X is a halogen, for example, chlorine, bromine or iodine. Water, in the vapor or superheated vapor state, enters into reactions (3) and (4) supra, which water is inevitably present in hydrocarbon combustion products. When the catalyst accumulates an average lead content within the range of 5% to 30% by weight, and, more commonly, 10% to 25% by weight, which may occur after anywhere from 1,000 to 20,000 road miles of operation, depending upon the presence or absence of catalyst guard media, average space velocity, concentration of lead in the motor fuel, physical and/or chemical properties of the catalyst, and various other factors, the hydrocarbon and carbon monoxide conversion activities of the catalyst have usually fallen to such a low value as to preclude continued use, and such lead-contaminated catalyst must therefore be replaced with fresh catalyst or regenerated in situ.

The instant invention has for its principal objective a method of effecting the continuous conversion of lead-containing waste products coupled with continuous regeneration of the lead-contaminated catalyst, and is founded upon the discovery that the conversion activity of such spent catalyst may be substantially restored by contacting it with a reducing atmosphere such as hydrogen, carbon monoxide, hydrocarbons, partially-oxidized hydrocarbons, mixtures of two or more of these and the like; advantageously, the exhaust gas of an internal combustion engine may be employed, in whole or in part, as the regenerating medium, whereupon the catalyst may be regenerated in situ; the present invention is particularly concerned with a multiple bed flow system which provides continuous, cyclic regenerative conversion of lead-containing exhaust gases, as exemplified in the drawings and hereinafter described.

Experimental data has shown that when a catalyst is exposed to contact with a preponderance of plumbiferous gases, the lead content of the catalyst eventually stabilizes at an equilibrium level, usually in the range of 10% to 25% by weight of lead, in a manner somewhat analogous to the deposition of coke upon cracking catalyst with the resultant attainment of "equilibrium" catalyst. The precise effect of the reducing atmosphere upon a lead compound-catalyst base complex is not established; it is established, however, that improved catalytic activity and any substantial degree of lead removal are not necessarily concomitant. For this reason it is believed that the reducing atmosphere converts the several lead compound-catalyst base complexes to a form or forms of lead, perhaps to metallic lead, which exert a substantially lessened deactivating effect upon the catalyst. In this connection, it should be pointed out that the present invention does not depend for its success upon any substantial degree of lead removal from the lead-contaminated catalyst; and, in fact, it is a feature of this invention to employ lead-containing exhaust gases as the regenerating medium, restricted only by the necessity that such gases are reducing, which is inherently realized in the case of vehicular internal combustion engines which are operated over a wide range of speed and load conditions and intermittently produce strongly reducing exhaust gases, that is, exhaust gases which are rich in incompletely burned fuel, during an appreciable portion of the total operating period, particularly during deceleration. When desired, a reducing agent may be added, as by injection, to the exhaust gas stream employed for catalyst regeneration in order to augment the reducing properties thereof or to maintain sufficient reducing activity during those periods of engine operation (cruising, accelerating), which do not yield exhaust gases having a sufficiently high concentration of unburned or partially burned hydrocarbons to readily effect regeneration.

In a broad embodiment, the present invention relates to an improvement in a process for the catalytic conversion of a catalytically convertible fluid wherein a conversion-promoting reactant is commingled with said convertible fluid and the resulting mixture is passed into contact at conversion conditions with a fixed particle-form bed of catalyst, said catalyst being deactivated by said mixture at conversion conditions but capable of being regenerated by said convertible fluid when the latter is substantially free of said conversion-promoting reactant, which improvement comprises passing a portion of said convertible fluid in admixture with said conversion-promoting reactant at conversion conditions through a first catalyst-containing zone to effect conversion of said portion of convertible fluid, passing the remainder of said convertible fluid without admixture of said conversion-promoting reactant therewith through a second catalyst-containing zone to effect at least partial regeneration of the catalyst therein, withdrawing effluent comprising said convertible fluid from said second zone and admixing therewith a conversion-promoting reactant, passing the resultant effluent-reactant mixture at conversion conditions through a third catalyst-containing zone to effect conversion of said effluent, and periodically interchanging in a rotating sequence said first, second and third zones.

A more specific embodiment of the present invention provides an improvement in a process for the catalytic purification of lead-contaminated exhaust gases emanating from an internal combustion engine using leaded fuel including the steps of commingling an oxygen-containing gas with said exhaust gases and subpjecting the resulting mixture to contact at conversion conditions with a lead-sensitive conversion catalyst, the conversion activity of the catalyst becoming thereby impaired by the adverse action of lead thereon but capable of being substantially restored by contacting the catalyst with a reducing atmosphere, which improvement comprises disposing said catalyst in three separte zones each containing a fixed particle-form bed of catalyst, passing a portion of said exhaust gases in admixture with an oxygen-containing gas at an elevated temperature through the first of said zones to effect conversion of said portion of exhaust gasses, passing the remainder of said exhaust gases without admixture of oxygen-containing gas therewith at an elevated temperature into and through the second of said zones to effect at least partial regeneration of the catalyst therein, withdrawing effluent comprising said remainder of exhaust gases from said second zone and commingling therewith an oxygen-containing gas, passing the resultant effluent-oxygen-containing gas mixture at an elevated temperature through the third of said zones to effect conversion of said effluent, and periodically interchanging in a rotating sequence said first, second and third zones.

The method of the present invention and the benefits afforded through the utilization thereof will be more clearly understood by defining several of the terms employed within the specification and the appended claims. The term "catalyst" or "conversion catalyst" is intended to connote an element, compound, composite of two or more elements or compounds, or mechanical mixture of elements, compounds or composites which are employed for their catalytic activity in regard to the conversion of various waste products, particularly hydrocarbons and/or carbon monoxide. The phrase "lead-sensitive conversion catalyst" designates a catalyst the conversion activity of which is adversely affected when subjected to contact, at conversion conditions, with lead-containing waste products, and, as such, it includes all known catalysts. The terms "lead," "lead-containing" and "lead-contaminated" refer to metallic lead, lead compounds, particularly lead salts such as the sulfates and halides thereof, lead oxides, lead oxyhalides, mixtures of two or more such lead compounds, lead-or lead salt-catalyst complexes etc., since the actual form or forms in which the lead may exist in the exhaust gases or in combination with the catalyst are not definitely known and, in any event, are of no consequence to the operability of the present method.

It is understood that the instant method of catalyst regeneration is applicable to a great many catalysts, and the invention is not therefore to be limited to utilization or regeneration of any one catalyst or class of catalysts.

Typical conversion catalysts suitable for use in the present invention comprise one or more catalytically active metallic components which are preferably composited with a refractory inorganic oxide carrier material. Suitable catalytically active metallic components include, but are not limited to, vanadium, chromium, molybdenum, tungsten, members of the iron group and platinum group of the periodic table, copper, silver and gold. A particular metal may be used singly or in combination with any of the foregoing metals. Thus, the catalyst may comprise metals selected from groups IB, VA, VIA and VIII of the periodic table. Especially desirable catalytically active metals or combinations thereof comprise the following: platinum, palladium, other noble metals such as iridium and rhodium, iron, cobalt, nickel, chromium, copper, vanadium, tungsten, molybdenum, manganese, silver, gold, and various mixtures including copper-cobalt, copper-iron, copper-chromium, nickel-chromium, cobalt-chromium, manganese-chromium, manganese-iron, platinum-iron, platinum-cobalt, platinum-nickel, palladium-iron, palladium-cobalt, palladium-nickel, palladium-copper, palladium-platinum, palladium-copper-cobalt, platinum-copper-cobalt, copper-cobalt-nickel-palladium, platinum-palladium-cobalt, etc.

The catalytically active metallic component or components are desirably composited with a refractory inorganic oxide, the latter serving as a carrier material therefor. Although greater stability and activity is usually obtained when the refractory inorganic oxide contains at least a portion of alumina, other suitable refractory inorganic oxides may be employed including silica, boria, titania, zirconia, hafnia, and mixtures of two or more. The carrier material may be manufactured by any suitable method including separate, successive, or coprecipitation methods of manufacture. The carrier material may comprise naturally occurring substances such as clays or earths, and may or may not be activated prior to use by one or more treatments including drying, calcining, steaming or particular treatments with inorganic and organic reagents.

The catalytically active metallic components, hereinabove set forth, may be added to the carrier material in any suitable, convenient manner. The catalytically active metallic components may be combined with the carrier material by separate, simultaneous, or successive precipitation methods, or by impregnating the carrier material with a soluble salt of the catalytically active metal. For example, when platinum is employed, it may be added to the carrier material by commingling the latter with an aqueous solution of chloroplatinic acid. Other water-soluble compounds of platinum, or of other noble metal components, may be utilized within the impregnating solution. When the catalyst is to contain other metallic components, the catalyst may be prepared by commingling soluble compounds of these components, particularly the nitrates, chlorides or carbonates, and soaking the particles of the inorganic refractory oxide therein, followed by heating to form the corresponding oxides of the metallic components. When impregnating techniques are employed, such impregnation may involve the use of one or more impregnating solutions containing one or more of the catalytically active metallic components. For example, when the catalyst is to contain both platinum and cobalt, the platinum may be impregnated within the carrier material, subsequently calcined, followed by a second impregnating technique incorporating the cobalt component. Although the precise means by which a metallic component is combined with a refractory carrier material is not known, it is believed that it exists in some physical association or chemical complex therewith. Thus, platinum may be present as a free metal, or as a chemical compound or in physical association with the carrier material, or with the other catalytically active metallic components, or in some combination with both. Many methods of preparing such catalytic composites exist and are well known in the prior art; these need not be described in detail herein since no claim is being made for any particular method of manufacturing the conversion catalyst.

The foregoing catalysts are representative of the type commonly employed in the conversion of exhaust gases and contemplated for use in the instant invention. They are not necessarily equivalent in respect to activity, selectivity toward hydrocarbon or carbon monoxide conversion, or stability, but all are susceptible in varying degrees to lead poisoning in the manner aforesaid. After the catalyst has been exposed to contact with lead-containing exhaust gases under conversion conditions for a sufficient time as to become substantially deactivated, which may occur after anywhere from 1000 to 20,000 equivalent road miles of use, it is regenerated according to the instant invention by temporarily suspending the normal exhaust gas conversion reactions and passing a regenerating medium comprising a reducing atmosphere over the catalyst in situ. The regenerating medium must be reducing with respect to lead and as such may comprise hydrogen, carbon monoxide, organic materials, particularly saturated hydrocarbons such as methane, ethane, propane, butanes, pentanes, gasoline boiling range hydrocarbons, naphthas, middle distillates, incompletely oxidized combustion products of a motor fuel, mixtures of two or more of these, and the like. It is a particular feature of this invention to employ the exhaust gas of the internal combustion engine itself as the regenerating medium, or principal constituent of the regenerating medium, with or without addition thereto of reducing agent.

The regenerating medium is preferably maintained in the gaseous or vapor state and is contacted with the catalytic mass at a temperature within the range of about 200° F. to about 2000° F., and preferably at a temperature within the range of about 500° F. to about 1600° F. At higher temperatures some of the lead may be reduced to molten metallic droplets and swept free of the catalyst by entrainment with the reducing gas, and at still higher temperatures the lead may be reduced to metallic vapors and stripped free of the catalyst; however, as pointed out above, such lead removal is not necessary and is only incidental to the main purpose of the invention, which is to improve the activity of the catalyst with respect to exhaust gas conversion.

The time required to effect the regeneration depends, of course, upon a number of variables such as the initial and/or equilibrium concentration of lead in the catalyst, the size and disposition of the catalyst particles, the temperature and space velocity of the regenerating gas, and the concentration of reducing materials in the regenerating gas. The pressure of regeneration will usually lie in the range of from 0 to 10 p.s.i.g., corresponding to normal engine exhaust manifold pressures.

The effectiveness of regenerating a lead-contaminated catalyst by means of a reducing atmosphere is demonstrated by the following examples which are presented for the purpose of illustrating the operability of the present invention but not with the intention of unduly limiting the same, either in respect of process flow or in respect of the reagents, concentrations, and/or conditions employed within the examples.

EXAMPLE I

A catalyst comprising 0.4% platinum on alumina was contaminated with lead by prolonged exposure to exhaust gases emanating from an internal combustion engine using leaded fuel. A portion of the leaded catalyst was divided into two samples, designated catalyst A and catalyst B in Table I below. Catalyst A was treated with a stream of hydrogen at 1500° F., and catalyst B was treated with a stream of carbon monoxide at 1500° F., under conditions shown in Table I. The activities of the untreated and treated catalysts, as well as that of fresh catalyst, were tested by measuring the ignition temperature and temperature rise obtained by passage of air containing benzene vapor, under standardized conditions, through an apparatus in which a bed of the catalyst was gradually heated until ignition of the benzene vapor occurred (as indicated by a temperature differential between the bed inlet and bed outlet). A small temperature rise and/or a high ignition temperature indicate a low conversion activity.

The conditions of treatment of the deactivated catalyst and a comparison of the activities of fresh catalyst and regenerated catalyst are shown in Table I.

prising 0.4% platinum by weight on alumina. The catalyst, in the form of ⅛" spheres, was loaded to a bed depth of about 6", the bed being disposed upon a supporting screen within the convertor. A second screen was arranged above the catalyst bed and a layer of ¼" ceramic balls was placed thereon to facilitate the even distribution of the exhaust gases flowing downwardly through the bed. Means were provided for injecting secondary air into the inlet of the convertor. Samples of the inlet and outlet gases entering and leaving the convertor were periodically withdrawn and analyzed for hydrocarbon content by a Liston-Becker non-dispersive infra-red gas analyzer employing a hexane cell detector. By difference between hydrocarbon content of inlet and outlet samples, the percent hydrocarbon conversion was thus determined at periodic intervals during the test run, and the decline in catalyst activity as a function of time readily observed therefrom. In reporting the results of the analyses performed on the exhaust gas samples, the term "hydrocarbon" connotes all hydrocarbons whether saturated, unsaturated, or partially oxidized, as determined by the aforementioned analytical method.

The engine was first run for a period of 40 hours at 2500 r.p.m. and 41 brake horsepower, using fuel leaded with 3 milliliters of tetraethyl lead as motor mix. The air:fuel ratio, as determined by the carburetor setting, was optimum (about 12.5) during this period. Secondary air was pressured into the inlet of the convertor and its flow rate was held at about 20 pounds per hour. The percent exhaust gas conversion during the 40-hour period declined from 87% to 55%.

At this point secondary air injection was terminated and the air:fuel ratio was enriched to about 11.0. The engine was then run on a 2 minute automatic cycle (including conditions of idling, accelerating, cruising and decelerating, according to a standard, predetermined pattern) for a period of 14 hours. Secondary air was then reintroduced and the percent exhaust gas conversion of the catalyst was found to have been restored to 77%.

*Table I*

| Catalyst | Weight Percent Lead | Activity Before Reactivation | | Reactivating Treatment | | Wt. Percent Lead After Reactivation | Activity After Reactivation | |
|---|---|---|---|---|---|---|---|---|
| | | Ignition Temp., °F. | Temp. Rise, °F. | Time at 1,500° F., Hours | Reducing Gas, cc./min. per 100 cc. Catalyst | | Ignition Temp., °F. | Temp. Rise, °F. |
| Fresh | 0 | 325 | 450 | | | | | |
| A | 18.9 | 375 | 125 | 5 | 3,900 | 14.5 | 430 | 400 |
| B | 19 | 375 | 45 | 5 | 3,900 | 13.7 | 355 | 220 |

These results are particularly striking in view of the fact that, although the reactivating treatment only reduced the lead content of the catalyst by less than 30%, yet the conversion activity was increased three-fold in the case of catalyst A and five-fold in the case of catalyst B.

EXAMPLE II

An evaluation of regenerating spent catalyst by intermittent treatment, in situ, with reducing exhaust gases was accomplished by means of a particular test designed to simulate conditions which would be encountered in the actual operation of a motor vehicle. The test procedure involved the utilization of a standard dynamometer, whereby an eight-cylinder gasoline engine was loaded or driven by a motor-generator. A vertically oriented cylindrical vessel or convertor, having an inside diameter of about 8", was serially connected in the engine exhaust line so that the exhaust entered the top of the convertor and flowed downwardly therethrough. The convertor was loaded with a conversion catalyst com- Two more successive regeneration treatments, of 13 hours' and 22 hours' duration, improved the conversion to 85% and 94%, respectively.

The results of Example II clearly demonstrate the feasibility and utility of employing exhaust gases emanating from an internal combustion engine as the source of the reducing atmosphere for effecting the regeneration of a lead-contaminated catalyst.

As hereinabove set forth, the present invention is particularly directed to a multiple "swinging" bed catalytic conversion process designed to utilize the catalyst-regenerating properties of reducing exhaust gases, and to effect continuous conversion of exhaust gases in one fixed bed simultaneously with continuous regeneration of another fixed bed of catalyst which has become deactivated in a preceding phase of operation.

To obtain a clearer picture of the invention, attention is now directed to the drawings which are illustrative of the best mode of practicing the invention but are not intended to be limiting upon the broad scope thereof.

FIGURE 4 illustrates an apparatus and flow system capable of placing the process of FIGURE 3 on a continuous basis.

Figure 1:
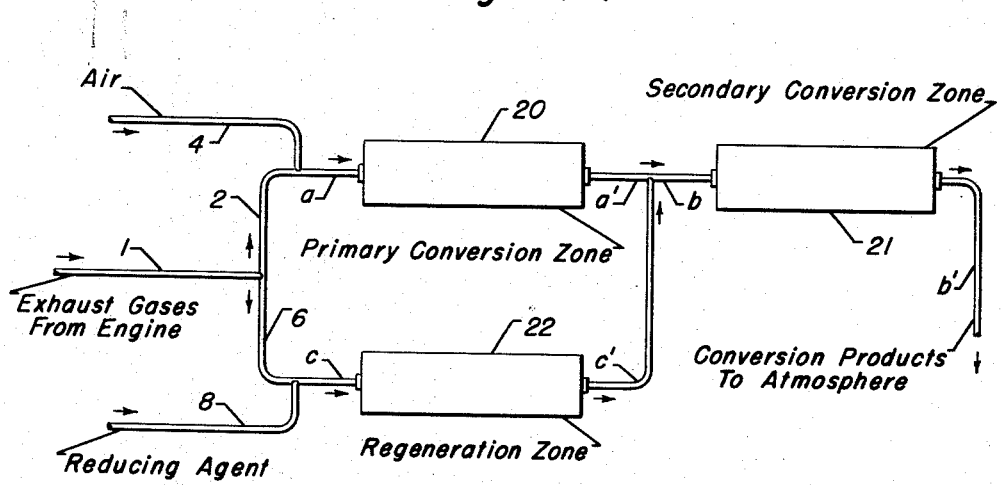
FIGURE 1 is a simplified schematic flow diagram of one embodiment of the invention.

Referring first to FIGURE 1, the system uses three separate catalyst beds, two of which, designated "primary conversion" and "regeneration" zones, numbered 20 and 22, respectively, are connected in parallel and the parallel combination is connected upstream of and in series with the third bed, designated "secondary conversion" zone 21. Exhaust gas from the engine enters line 1 and is split into two streams: a portion of the exhaust gas flows through branch 2, is mixed with secondary air introduced through line 4, and the air-exhaust gas mixture is passed via inlet line a into convertor 20 wherein conversion of the exhaust gas occurs; the remainder of the exhaust gas flows through branch 6, is mixed with a reducing agent (optional) added through line 8, and the exhaust gas-reducing agent mixture is passed via inlet line c into convertor 22 wherein regeneration of lead-contaminated catalyst occurs. Although some conversion of the exhaust gas may take place in the regeneration zone by virtue of reduction of lead compounds and consequent oxidation of an equivalent amount of exhaust gas, the necessity of maintaining a reducing atmosphere therein and the generally high space velocity of the regenerating gas in relation to regeneration reaction rates result in substantially little overall conversion of the regenerating gas; hence, it is necessary to provide secondary conversion zone 21 to clean up such unconverted gas. A sufficient excess of secondary air is added to that portion of exhaust gas entering converter 20 to convert the entirety of the exhaust gas entering the system through line 1, as well as to convert the reducing agent added through line 8 if the latter is employed. Thus, the conversion products leaving convertor 20 through outlet line a' contain a sufficient amount of free oxygen to convert the unconverted exhaust gas and reducing agent present in the effluent leaving converter 22 through outlet line c'; the conversion products from convertor 20 and the effluent from convertor 22 are commingled and the resulting mixture is passed through inlet line b into convertor 21 wherein the regeneration zone effluent is converted. The total conversion products are withdrawn from convertor 21 through outlet line b' and are subsequently discharged to the atmosphere, as by a tailpipe.

It is desirable to insulate the system to conserve heat and maintain sufficiently elevated temperatures, in the range of 500° F. to 1600° F., in order to effect conversion and regeneration in the respective zones. The exothermic heat of reaction liberated in primary conversion zone 20 is more than adequate to offset the cooling effect of excess secondary air, and advantageously preheats the combined streams passed into secondary conversion zone 21.

Figure 2:
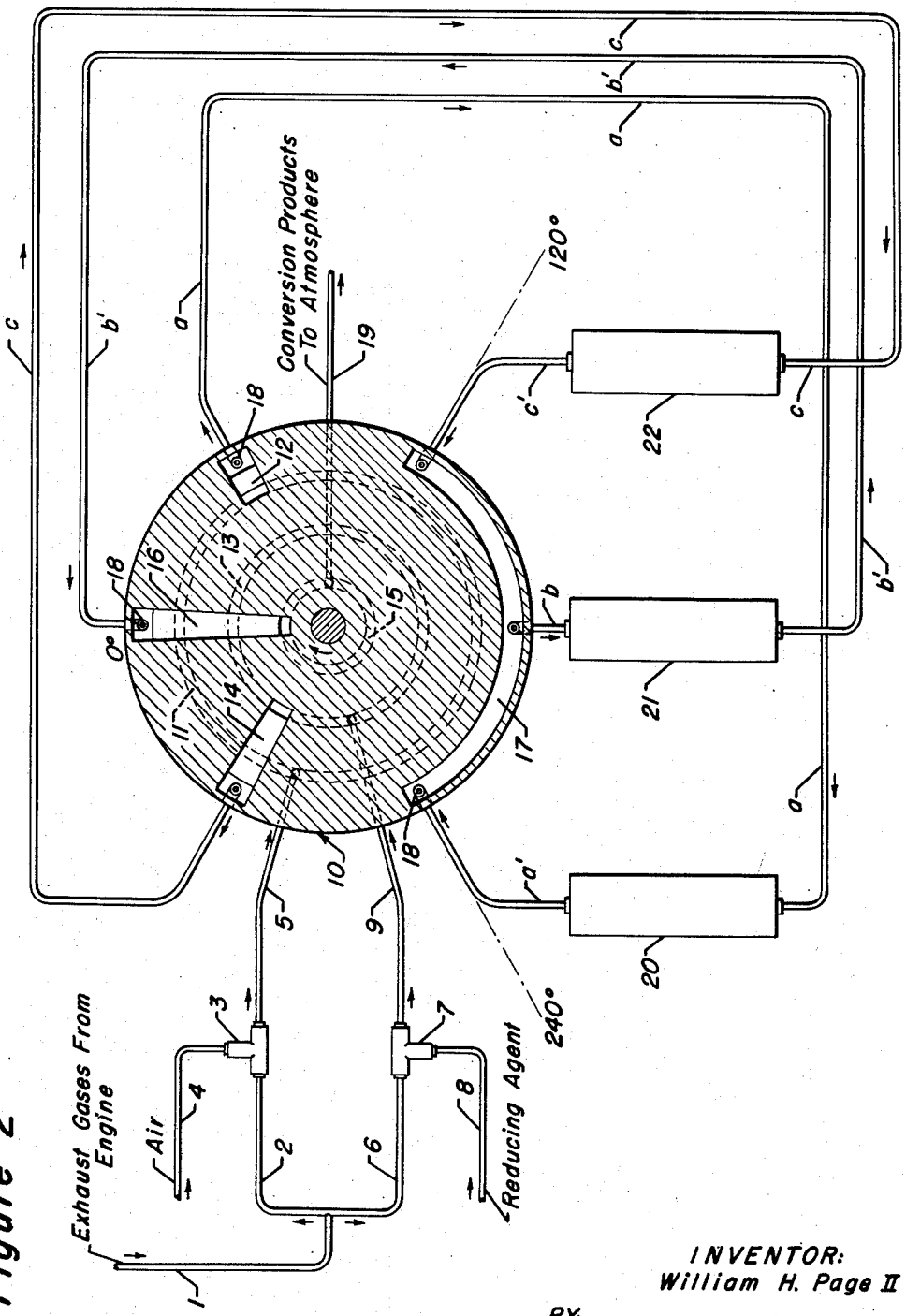
FIGURE 2 shows an apparatus and flow scheme suitable for achieving continuous operation of the process of FIGURE 1.

In order to operate the process of FIGURE 1 on a continuous basis, it is necessary to provide appropriate valve means capable of changing the interconnections of the various fluid inlet and outlet lines (a—a', b—b', c—c') associated with convertors 20, 21 and 22, respectively, so that each of the three physical catalyst beds may be functionally interchanged from time to time, in a rotating sequence. That is, each of convertors 20, 21 and 22 is caused to function, in turn, as the primary conversion, regeneration and secondary conversion zones; or alternatively, as the primary conversion, secondary conversion and regeneration zone, in that order. A suitable apparatus and flow system therefor is shown in FIGURE 2, in which those elements which are identical with those of FIGURE 1 have the same number or letter. Although FIGURE 2 shows a rotary distributing valve for accomplishing stream transfer and the description of the process will be directed thereto, it is understood that any other equivalent stream-switching means, such as a network of block valves, may be employed if desired.

Turning now to FIGURE 2, a rotor member 10 of a rotary disc-type distributing valve is shown in a sectional plan view and seats upon a stator member which is hidden from view beneath the rotor. The undersurface of rotor 10 is provided with three circular radially spaced tracks or grooves numbered 11, 13 and 15. The upper portion of rotor 10 is provided with three adjacent, radially extending channels, numbered 14, 16 and 12, spaced 60° apart; each of said channels is in continuous communication at its inner end with one of the circular grooves via a vertical slot, and communicates at its outer end with the upper surface of the stator via another vertical slot; thus, a sectional elevation view of the rotor taken through a channel would show a channel having in inverted U-shaped section. Channel 12 communicates with groove 11, channel 14 with groove 13, and channel 16 with groove 15. An arcuate slot 17, extending 120°, is cut through the outer portion of rotor 10 and is symmetrically disposed diametrically opposite the middle of the three channels (channel 16). Six ports 18 are circumferentially spaced 60° apart in the stator member; for any adjusted position of rotor 10, three adjacent ports 18 communicate with the three channels 14, 16 and 12 and the remaining three ports communicate with slot 17. Rotor 10 has three adjusted angular positions during a 360° rotation thereof. Using channel 16 as a reference marker, consider the indicated rotor position to be 0°; when the rotor is turned clockwise, the second adjusted position is 120°, and the third adjusted position is 240°. The inlet lines (a, b, c) and outlet lines (a', b', c') of convertors 20, 21 and 22, respectively, are connected to diametrically opposite ports 18. An air-exhaust gas conducting transfer line 5 is connected through the stator to communicate with rotor groove 11; similarly, a regenerating gas transfer line 9 communicates with groove 13, and a conversion products discharge line 19 with groove 15.

When the rotor has the position shown in FIGURE 2 (0°) the flow system corresponds to the diagram of FIGURE 1, that is, convertor 20 serves as the primary conversion zone, convertor 21 as the secondary conversion zone, and convertor 22 as the regeneration zone. Exhaust gas enters the system through line 1 and is split into two streams: one of the streams flows through line 2 and air injector or aspirator 3 causing air to be admixed therewith via line 4; the resulting air-exhaust gas mixture passes through line 5, groove 11, channel 12, and line a into convertor 20; the other of the incoming exhaust gas streams flows through line 6 and aspirator 7, which is connected via line 8 to a source of reducing agent, for example, with the engine fuel tank, whereby a controlled volume of reducing agent is injected into the exhaust gas stream, and the resultant exhaust gas-reducing agent mixture constituting the regenerating gas, passes through line 9, groove 13, channel 14 and line c into convertor 22. Conversion products leave convertor 20 through line a', regeneration zone effluent leaves convertor 22 through line c', and the two streams are combined in slot 17 and fed therefrom to convertor 21 through line b. The total conversion products from convertor 21 flow through line b', channel 16, groove 15, and discharge via line 19 to the atmosphere.

If now, rotor 10 is advanced clockwise through 120°, convertor 20 becomes the regeneration zone, convertor 21 the primary conversion zone, and convertor 22 the secondary conversion zone. When rotor 10 is again advanced through another 120°, corresponding to alignment of channel 16 with the 240° position indicated in FIGURE 2, convertor 20 becomes the secondary conversion zone, convertor 21 the regeneration zone, and convertor 22 the primary conversion zone. Thus, as rotor 10 is rotated in 120° increments, each convertor is functionally interchanged with the next in a rotating sequence. When desired, the rotor may be moved in a counterclockwise direction, in which case the order of substitution of the catalyst beds would be reversed. The following Table II summarizes the functions of the three convertors vs. rotor position for clockwise and counterclockwise rotation.

*Table II*

|  | Clockwise Rotation, Rotor Position | | | Counterclockwise Rotation, Rotor Position | | |
| --- | --- | --- | --- | --- | --- | --- |
|  | 0° | 120° | 240° | 0° | 120° | 240° |
| Primary Conversion Zone, Converter No. | 20 | 21 | 22 | 20 | 22 | 21 |
| Secondary Conversion Zone, Convertor No. | 21 | 22 | 20 | 21 | 20 | 22 |
| Regeneration Zone, Convertor No. | 22 | 20 | 21 | 22 | 21 | 20 |

Rotor 10 may be manually operated from time to time, or automatically rotated at fixed time intervals by a suitable timing mechanism, or automatically rotated in response to some process condition which is indicative of reduced catalytic activity in the catalyst beds presently functioning as the primary and secondary conversion zones. Inasmuch as the conversion reactions are exothermic and the whole system is fairly adiabatic, a very convenient process condition for this purpose is temperature, either the temperature of the conversion products or, preferably, the temperature differential or rise across the complete multiple zone system. Thus, the temperature of the exhaust gases entering line 1 and the temperature of the conversion products leaving through line 19 may each be measured, and the difference therebetween utilized to actuate a suitable valve driving mechanism upon occurrence of a predetermined minimum differential temperature.

The requisite amounts of air and reducing agent may be conveniently controlled by proper sizing of injectors 3 and 7. The use of a reducing agent is not mandatory since sufficiently reducing exhaust gas is generated whenever the internal combustion engine is decelerated, which occurs quite frequently in typical urban driving patterns; however, during prolonged periods of high speed driving, when the exhaust gas is relatively lean in unburned hydrocarbons, it will usually be desirable to augment with such reducing agent that portion of the exhaust gas which is employed for catalyst regeneration.

Figure 3:
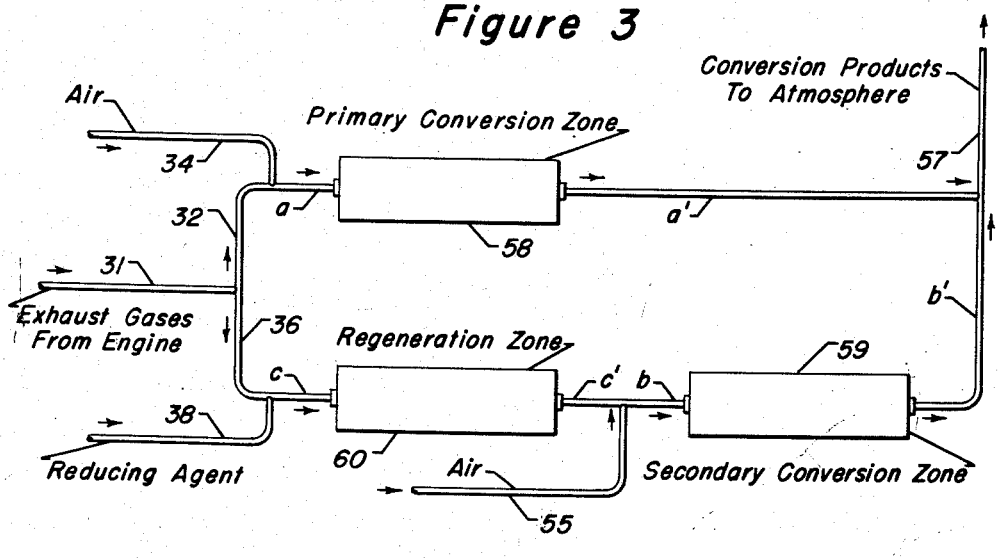
FIGURE 3 is a simplified schematic flow diagram of a second embodiment of the invention.

Another embodiment of the invention is shown diagrammatically in FIGURE 3, wherein secondary conversion zone 59 is connected downstream of and in series only with regeneration zone 60; primary conversion zone 58 is connected in parallel with the series combination of zones 60 and 59. Exhaust gas from the engine enters line 31 and is split into two streams: a portion of the exhaust gas flows through branch 32, is mixed with secondary air introduced through line 34, and the air-exhaust gas mixture is passed via inlet line *a* into convertor 58 wherein conversion of the exhaust gas occurs; the remainder of the exhaust gas flows through branch 36, is mixed with a reducing agent (optional) added through line 38, and the exhaust gas-reducing agent mixture is passed via inlet line *c* into convertor 60 wherein regeneration of lead-contaminated catalyst occurs. Effluent comprising unconverted exhaust gas is withdrawn from convertor 60 through line *c'*, is admixed with air introduced through line 55, and the air-effluent mixture is passed via line *b* into secondary conversion zone 59 wherein conversion of the effluent is effected. Conversion products are withdrawn from primary conversion zone 58 via line *a'* and from secondary conversion zone 59 via line *b'* and the two streams are combined and discharged to atmosphere through line 57. The process of FIGURE 3 achieves a lower overall pressure drop than the process of FIGURE 1 since the total exhaust gas flow does not pass through a single convertor, but requires a second air injector and a somewhat more involved stream transferring means for rotating the zones.

A suitable apparatus for operating the process of FIGURE 3 in a continuous, cyclic manner is shown in FIGURE 4, in which elements which are identical with those of FIGURE 3 have the same number or letter. In FIGURE 4, a rotor member 40 of a rotary disc-type distributing valve is shown in a sectional plan view, and seats upon a stator member which is hidden from view beneath the rotor. The undersurface of rotor 40 is provided with five circular radially spaced tracks or grooves numbered 41, 43, 45, 48 and 50. The upper portion of rotor 40 is provided with six radially extending channels, numbered 47, 42, 49, 51, 46 and 44, spaced 60° apart. These channels are of an inverted U-shape in their elevational sections as previously described with reference to the valve of FIGURE 2, each channel continuously communicating with a circular groove at its inner end and with the upper surface of the stator at its outer end. Channel 42 communicates with groove 41, channel 44 with groove 43, channels 46 and 47 with groove 45, channel 49 with groove 48, and channel 51 with groove 50. Six ports 52 are circumferentially spaced 60° apart in the stator member; for successive adjusted positions of rotor 40, each of the ports 52 communicates with alternate channels. Rotor 40 has three adjusted angular positions during a 360° rotation thereof. Using channel 47 as a reference marker, consider the indicated rotor position to be 0°; when the rotor is turned counterclockwise, the second adjusted position is 120°, and the third adjusted position is 240°. The inlet lines (*a*, *b*, *c*) and outlet lines (*a'*, *b'*, *c'*) of convertors 58, 59, and 60, respectively, are connected to diametrically opposite ports 52. An air-exhaust gas conducting transfer line 35 is connected through the stator to communicate with rotor groove 41; similarly, a regenerating gas transfer line 39 communicates with groove 43, and a conversion products discharge line 57 with groove 45. An air injector 54 is connected between rotor grooves 48 and 50 by lines 53 and 56.

When the rotor has the position shown in FIGURE 4 (0°), the flow system corresponds to the diagram of FIGURE 3, that is, convertor 58 serves as the primary conversion zone, convertor 59 as the secondary conversion zone, and convertor 60 as the regeneration zone. Exhaust gas enters the system through line 31 and is split into two streams: one of the streams flows through line 32 and air injector or aspirator 33 causing air to be admixed therewith via line 34; the resulting air-exhaust gas mixture passes through line 35, groove 41, channel 42 and line *a* into convertor 58; the other of the incoming exhaust gas streams flows through line 36 and injector 37, causing reducing agent to be admixed therewith via line 38; the resulting exhaust gas-reducing agent mixture, constituting the regenerating gas, passes through line 39, groove 43, channel 44 and line *c* into convertor 60. Regeneration zone effluent leaves convertor 60 through line *c'*, flows through channel 49, groove 48 and line 53 into and through air injector 54, causing air to be introduced into the effluent stream through line 55; the resulting effluent-air mixture is passed through line 56, groove 50, channel 51 and line *b* into convertor 59. Conversion products leave convertor 59 through line *b'* and are passed via channel 47 into groove 45; likewise, conversion products leave convertor 58 through line *a'* and are passed via channel 46 into groove 45. The combined conversion products stream is withdrawn from groove 45 through line 57 and is ultimately released to the atmosphere.

When rotor 40 is advanced counterclockwise through 120°, convertor 58 becomes the secondary conversion zone, convertor 59 the regeneration zone, and convertor 60 the primary conversion zone. When rotor 40 is again advanced through another 120°, corresponding to alignment of channel 47 with the 240° position indicated in FIGURE 4, convertor 58 becomes the regeneration zone, convertor 59 the primary conversion zone, and convertor 60 the secondary conversion zone. Thus, as rotor 40 is rotated in 120° increments, each convertor is functionally interchanged with the next in a rotating sequence. When desired, the rotor may be moved in a clockwise direction, in which case the order of substitution of the catalyst beds would be reversed. The following Table III summarizes the functions of the three convertors vs. rotor position for counterclockwise and clockwise rotation.

Table III

|  | Counterclockwise Rotation, Rotor Position | | | Clockwise Rotation, Rotor Position | | |
|---|---|---|---|---|---|---|
|  | 0° | 120° | 240° | 0° | 120° | 240° |
| Primary Conversion Zone, Convertor No. | 58 | 60 | 59 | 58 | 59 | 60 |
| Secondary Conversion Zone, Convertor No. | 59 | 58 | 60 | 59 | 60 | 58 |
| Regeneration Zone Convertor No. | 60 | 59 | 58 | 60 | 58 | 59 |

As with the embodiment of FIGURE 2, the distributing valve of FIGURE 4 may be manually or automatically rotated, either according to a fixed time cycle or in response to low differential temperature across the system, that is, the temperature difference between exhaust gases entering line 31 and the conversion products leaving through line 57.

The advantages of either embodiment of the invention as set forth above are manifest. By providing three separate catalytic zones and cyclically interchanging them in a rotating sequence whereby simultaneous conversion and regeneration occur, a lead-sensitive catalyst may be continuously employed indefinitely for the conversion of lead-containing exhaust gases without need for catalyst replacement or external regeneration thereof, and without having to operate the internal combustion engine at other than optimum conditions. When injection of a reducing agent into the regenerating gas is employed, continuous regeneration of the catalyst is assured even though the engine is operated for prolonged periods at constant speed whereby the exhaust gases per se may not comprise a sufficiently reducing atmosphere to effect such regeneration.

I claim as my invention:

1. In a process for the catalytic purification of lead-contaminated exhaust gases emanating from an internal combustion engine using leaded fuel including the steps of commingling an oxygen-containing gas with said exhaust gases and subjecting the resulting mixture to contact at oxidizing conditions with a solid oxidation catalyst, the oxidizing activity of the catalyst becoming thereby impaired by the adverse action of lead thereon but capable of being substantially restored by contacting the catalyst with a reducing atmosphere, the improvement which comprises disposing separate portions of said catalyst in a fixed particle-form bed in a first, a second and a third contacting zone, each of said first and third zones containing active oxidation catalyst and said second zone containing catalyst whose activity has been impaired by the adverse action of lead thereon during previous use thereof in the oxidation of exhaust gases from said engine, passing a portion of said exhaust gases in admixture with an oxygen-containing gas at an elevated temperature through said first zone to effect oxidation of said portion of exhaust gases, passing the remainder of said exhaust gases without admixture of oxygen-containing gas therewith at reducing conditions into and through said second zone for a sufficient time to effect at least partial regeneration of the catalyst therein, withdrawing effluent comprising said remainder of exhaust gases from said second zone and commingling therewith an oxygen-containing gas, passing the resultant effluent-oxygen-containing gas mixture at an elevated temperature through said third zone to effect oxidation of said effluent, and periodically interchanging in a rotating sequence said first, second and third zones.

2. The method of claim 1 further characterized in that said engine is intermittently decelerated to produce, during such periods of deceleration, exhaust gases containing a relatively large amount of incompletely burned fuel.

3. The method of claim 1 further characteried in that a reducing agent is commingled with those exhaust gases which are passed into said second zone.

4. The method of claim 3 further characterized in that said reducing agent comprises a hydrocarbonaceous motor fuel.

5. In a process for the catalytic purification of lead-contaminated exhaust gases emanating from an internal combustion engine using leaded fuel including the steps of commingling an oxygen-containing gas with said exhaust gases and subjecting the resulting mixture to contact at oxidizing conditions with a solid oxidation catalyst, the oxidizing activity of the catalyst becoming thereby impaired by the adverse action of lead thereon but capable of being substantially restored by contacting the catalyst with a reducing atmosphere, the improvement which comprises disposing separate portions of said catalyst in a fixed particle-form bed in a first, a second and a third contacting zone, each of said first and third zones containing active oxidation catalyst and said second zone containing catalyst whose activity has been impaired by the adverse action of lead thereon during previous use thereof in the oxidation of exhaust gases from said engine, passing a portion of said exhaust gases in admixture with an excess of oxygen-containing gas at an elevated temperature through said first zone to effect oxidation of said portion of exhaust gases, passing the remainder of said exhaust gases without admixture of oxygen-containing gas therewith at reducing conditions into and through said second zone for a sufficient time to effect at least partial regeneration of the catalyst therein, withdrawing conversion products comprising unreacted oxygen-containing gas from said first zone, withdrawing effluent comprising said remainder of exhaust gases from said second zone, commingling said conversion products with said effluent and passing the resultant conversion products-effluent mixture at an elevated temperature through said third zone to effect oxidation of said effluent, and periodically interchanging in a rotating sequence said first, second and third zones.

6. The method of claim 5 further characterized in that a reducing agent is commingled with those exhaust gases which are passed into said second zone.

7. The method of claim 1 further characterized in that said remainder of the exhaust gases is passed into and through said second zone after the catalyst therein has accumulated from about 5% to about 30% by weight of lead.

8. The method of claim 5 further characterized in that said remainder of the exhaust gases is passed into and through said second zone after the catalyst therein has accumulated from about 5% to about 30% by weight of lead.

9. A process for purifying lead-contaminated exhaust gases discharging from an internal combustion engine operating on leaded hydrocarbon fuel, which comprises
   (1) contacting a portion of said exhaust gases in admixture with oxygen and at oxidizing temperature with a first bed of solid oxidation catalyst,
   (2) contacting another portion of said exhaust gases at reducing conditions with a second bed of said catalyst whose activity has been impaired by the adverse action of lead thereon during previous use thereof in the oxidation of exhaust gases from said engine, the last-named contacting being for a sufficient time to effect at least partial regeneration of said second catalyst bed, (3) commingling oxygen with the gaseous effluent from said second bed and contacting the resultant mixture at oxidizing temperature with a third bed of active oxidation catalyst, and (4) periodically interchanging in a rotating sequence said first, second and third catalyst beds.

References Cited in the file of this patent

UNITED STATES PATENTS

| | | |
|---|---|---|
| 2,246,345 | Campbell | June 17, 1941 |
| 2,635,707 | Gilmore | Apr. 21, 1953 |
| 2,742,346 | Miller | Apr. 17, 1956 |

FOREIGN PATENTS

| | | |
|---|---|---|
| 411,377 | Great Britain | June 7, 1934 |